April 7, 1959
R. E. RESK
2,881,303
VAPORIZERS
Filed Jan. 10, 1955
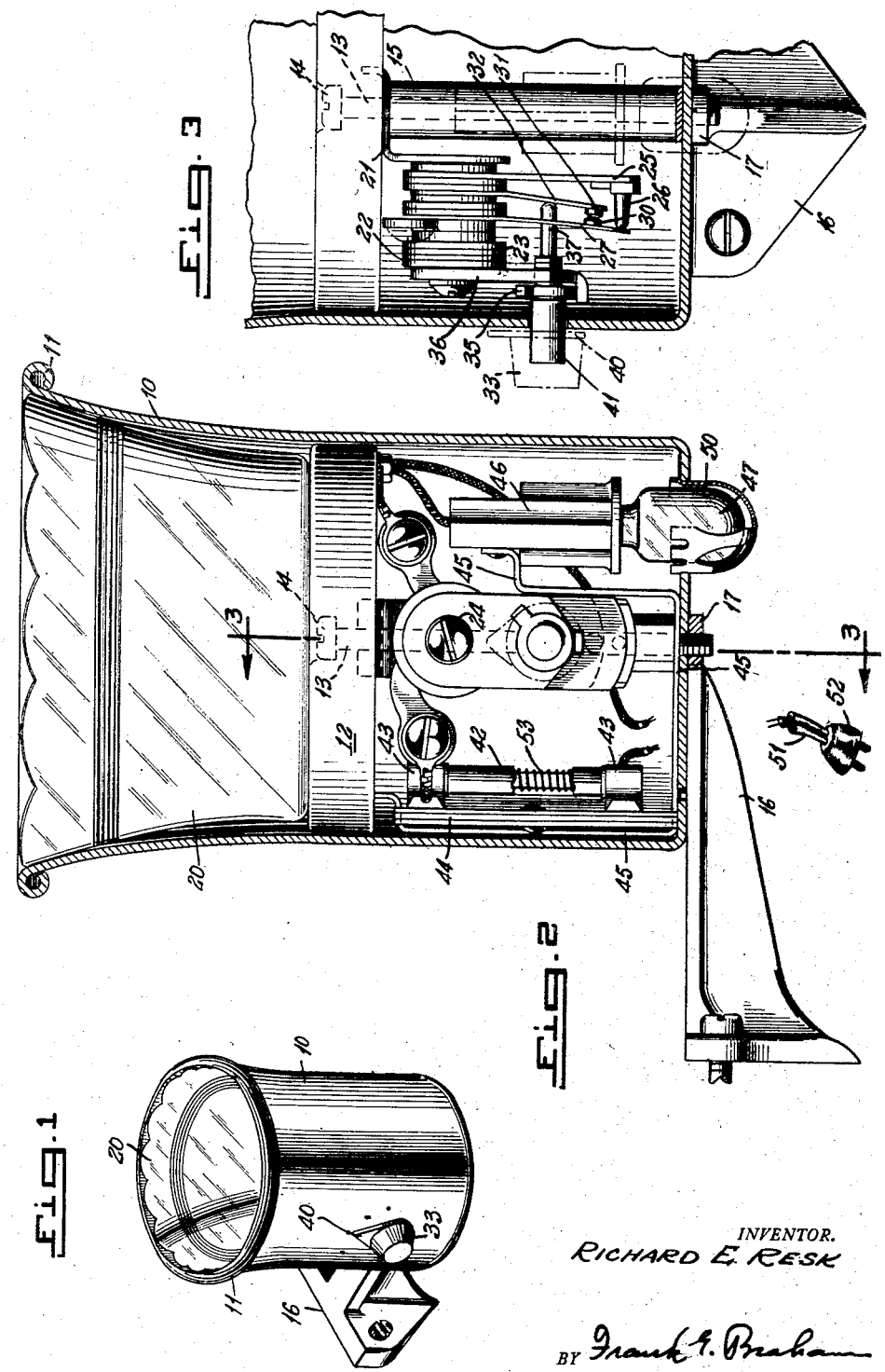
INVENTOR.
RICHARD E. RESK
BY Frank G. Braham
ATTORNEY

2,881,303

VAPORIZERS

Richard E. Resk, Brooklyn, N.Y.

Application January 10, 1955, Serial No. 480,882

1 Claim. (Cl. 219—44)

This invention relates to devices for vaporizing insecticides or sanitizing or deodorizing agents. More particularly, it relates to a vaporizer having a thermostatically controlled electrical heating element in which the rate of vaporization can be adjustably controlled.

An object of the invention is to provide a new and improved vaporizer for insecticides and the like. Further objects reside in the provision of an effective vaporizer which is of simple construction, economical manufacture and dependable operation.

In carrying out my invention to meet the foregoing objects, I provide a container in which is mounted a ceramically enclosed heating element. A non metallic, non oxidizing receptacle for the material to be vaporized is placed directly atop the heating element and the side walls of the receptacle extend at least as high as the walls of the container so that the vapors from the mass of material can pass into the atmosphere without contacting the container. Below the heating element and spaced therefrom is the thermostat unit which controls the amount of heat applied to the receptacle and material therein.

Features and advantages of this invention will be apparent from the foregoing and the description which follows.

In the drawing:

Figure 1 is a view in perspective of a vaporizer according to the present invention;

Figure 2 is a side elevation partly in section of the apparatus; and

Figure 3 is a view taken along line 3—3 of Figure 2.

Reference will be made to the figures conjointly in describing a preferred embodiment of my invention and attention is now directed to the same.

The container 10 is preferably of aluminum and is formed having gently flared side walls terminating in a rounded lip 11. The container may be formed as by spinning or deep drawing which processes are generally well known in the metal forming arts. It may be finished by polishing to form a high gloss surface or painted as by crinkle painting.

Within the container and approximately mid way between its open top and the bottom surface is mounted the ceramic enclosed heating unit 12. A countersunk opening 13 is provided through the center of unit 12 to accommodate securing screw 14 which passes through the heating unit, mounting stud 15, the bottom of container 10 and wall bracket 16. The bracket is provided with a threaded hole 17 into which screw 14 is turned. In this manner the heating unit is secured within container 10 and the two together secured to the wall bracket by means of which the vaporizer may conveniently be mounted on a wall or post.

Directly atop the heating unit is the receptacle 20 in which is placed the material to be vaporized. The receptacle is preferably of non-metallic construction, e.g. Pyrex glass, or any non-oxidizing material. It will thus be noted that the heat from heating unit 12 is not directly applied to any metallic portion of the vaporizer. This has been found to be of extreme importance when commercial insecticides such as Lindane are being vaporized. The top of receptacle 20 is further seen to be aligned with the lip 11 of container 10 in order that the insecticide vapors may pass directly into the atmosphere without coming into contact with the metallic container 10. Receptacle 20 may be held in place in container 10 by spring clips (not shown) fastened to the inside wall of the container or by tabs (not shown) also fastened to the inside wall of the container and turned down over the top edge of the receptacle.

Secured between the heating unit 12 and stud 14 is angle bracket 21, on the long downwardly extending arm of which is mounted adjustable thermostat 22. The thermostat elements 23 are shown positioned on stud 24 which is threaded into bracket 21. Depending from one portion of the thermostat is arm 25, the extremity of which is provided with an abutment 26. Being urged against the abutment is leaf spring 27 which carries contact 30. A second electrical contact 31 is carried by contact arm 32. The contacts are normally in engagement so that an electrical circuit can be traced through them. However, under the control of the thermostat, the contacts may be separated to interrupt an electric circuit and, as will hereafter be seen, thereby discontinue the supply of electricity to the heating element.

To provide a control so that the thermostat will be operative to maintain any one of various predetermined temperatures, there is furnished a control knob 33. The knob is formed with a generally circular opening but having one portion thereof flattened so that it may cooperate with correspondingly formed shaft 34. The shaft has a threaded portion 35 which passes through a threaded hole in bent arm 36 so that as shaft 34 is rotated as by turning knob 33, it advances relative to arm 36. A reduced section 37 of the shaft passes, unobstructed, through an opening in leaf spring 27 and abuts contact arm 32. Thus as knob 33 is turned to advance shaft 34 (and its reduced section 37) the spring engagement between contacts 30 and 31 is adjusted. For example, as the shaft is advanced (moved towards the right in Figure 3) the tension between the contacts is lessened and they will separate at a lower temperature than if they were engaged at a higher tension. Knob 33 may be provided with a pointer 40 which will indicate various relative temperature settings on dial 41.

In the foregoing arrangement it will be noted that the thermostat is in spaced relationship to the heating element rather than in direct contact therewith. In this manner the temperature of the thermostat unit more nearly coincides with that of the material being vaporized and a more efficient unit results. If the thermostat is in direct contact with the heating element it will generally be in a higher temperature zone than the material being vaporized. Consequently it would tend to shut off the heater while the material is at a comparatively low temperature resulting therefore in sporadic operation.

An electric fuse 42 of the cartridge type is provided mounted in fuse clips 43. These clips are secured to board of electric insulation material 44 which in turn is fastened to bracket 45 which is secured under mounting stud 15.

Bracket 45 extends under stud 15 to the side thereof opposite the fuse assembly where it serves as the mounting piece for the lamp socket 46. The socket serves for the pilot lamp 47 which protrudes from container 10 and which can thus provide a visual indication that the vaporizer is in operation. Surrounding the pilot lamp is guard 50 which clips into place in container 10 and protects the lamp from accidental breakage.

An electric cord 51 is furnished with a plug 52 suitable for insertion in the ordinary electric outlet. As can be seen, the cord completes a circuit through fuse 42, the thermostat unit 22 (that is electric contacts 30 and 31) and heating element 12. The pilot lamp 47 is, of course, connected in parallel to the foregoing circuit. A resistor, i.e. a non-circuit interrupting current limiting device, of a fixed value may be inserted in series in the circuit to act as a current limiting device to control the maximum heat output of the unit and hence the vaporization rate. The resistor 53 may be mounted to bracket 45 alongside fuse 42.

In operation, the vaporizer will be mounted in the room or area selected for use about three feet below the ceiling thereof. The plug 52 will then be inserted into an outlet to supply electric current to the heating element and vaporize the material in receptacle 20. By turning knob 33 to adjust the thermostat unit the rate of vaporization can be controlled. Although I have described my invention using a plug-in cord, it is, of course, to be understood that a more permanent electric connection could be used with a toggle type switch interposed in the circuit to switch the unit on or off.

Having thus described my invention, it is to be understood that many apparent changes could be made in the apparatus without departing from the spirit and scope thereof and that what has been shown is to be considered in an illustrative rather than limiting sense.

What is claimed is:

A vaporizer for insecticides or the like comprising a generally cylindrical shaped container closed at one end thereof, a disk like ceramic member the diameter of which is substantially equal to the inside diameter of said container, a heating element enclosed in said ceramic member, a stud supporting said ceramic member above and parallel to the closed end of the container to provide a generally enclosed space formed by said ceramic member and the bottom and the lower portion of the wall of said container, a thermostat adjustable for operation at various selected temperatures, said thermostat being located in the enclosed space formed by the ceramic member and the container and supported from the aforesaid stud in spaced relationship to the ceramic member, an electric circuit for said heating element and said thermostat and including a non-circuit interrupting current limiting device and a fuse, a bracket secured between said stud and the bottom wall of the container on which the aforesaid current limiting device and fuse are mounted, and a non-metallic receptacle for the material to be vaporized, said receptacle being placed atop said ceramic member and having a shape generally conforming to that portion of the container above the ceramic member and being of a height such that it reaches at least to the top of said container.

References Cited in the file of this patent

UNITED STATES PATENTS

| | | |
|---|---|---|
| 1,975,464 | Kuengst | Oct. 2, 1934 |
| 1,982,358 | Smith | Nov. 27, 1934 |
| 2,258,210 | Maxwell | Oct. 7, 1941 |
| 2,448,577 | Chiarotti et al. | Sept. 7, 1948 |
| 2,597,695 | Braski | May 20, 1952 |
| 2,610,283 | Kolisch | Sept. 9, 1952 |
| 2,616,024 | Laibow | Oct. 28, 1952 |
| 2,619,576 | Greibach | Nov. 25, 1952 |
| 2,667,567 | Buehler | Jan. 26, 1954 |
| 2,685,020 | Laibow | July 27, 1954 |
| 2,690,500 | Winberg | Sept. 28, 1954 |
| 2,690,501 | Laibow | Sept. 28, 1954 |